United States Patent
Bolua et al.

[11] Patent Number: 5,910,873
[45] Date of Patent: Jun. 8, 1999

[54] FIELD OXIDE TRANSISTOR BASED FEEDBACK CIRCUIT FOR ELECTRICAL OVERSTRESS PROTECTION

[75] Inventors: Luis Sergio V. Bolua, Sunnyvale; Tuong Hai Hoang; Tony S. Lo, both of San Jose; Larry W. DeClue, Saratoga, all of Calif.

[73] Assignee: National Semiconductor Corporation, Santa Clara, Calif.

[21] Appl. No.: 08/802,366

[22] Filed: Feb. 19, 1997

[51] Int. Cl.$^6$ ....................................................... H02H 9/00
[52] U.S. Cl. ................................. 361/56; 361/111; 361/91
[58] Field of Search ............................... 361/56, 91, 111, 361/118; 257/355

[56] References Cited

U.S. PATENT DOCUMENTS

| | | | |
|---|---|---|---|
| 5,208,719 | 5/1993 | Wei | 361/56 |
| 5,255,146 | 10/1993 | Miller | 361/56 |
| 5,321,293 | 6/1994 | Mojaradi et al. | 257/369 |
| 5,352,915 | 10/1994 | Hutchings et al. | 257/361 |
| 5,371,395 | 12/1994 | Hawkins | 257/361 |
| 5,374,565 | 12/1994 | Hsue et al. | 437/30 |
| 5,406,105 | 4/1995 | Lee | 257/355 |
| 5,416,036 | 5/1995 | Hsue | 437/51 |
| 5,426,323 | 6/1995 | Reczek et al. | 257/360 |
| 5,440,162 | 8/1995 | Worley et al. | 361/56 |
| 5,449,939 | 9/1995 | Horiguchi et al. | 257/360 |
| 5,617,283 | 4/1997 | Krakawer et al. | 361/56 |

*Primary Examiner*—Sally C. Medley
*Attorney, Agent, or Firm*—Limbach & Limbach LLP

[57] ABSTRACT

A circuit for protecting an interface cable driver and the circuitry attached to the driver from electrical overstress damage, such as that which may arise from an electrostatic discharge. The protection circuit includes a sensing element, typically a field oxide transistor, which is used to sense when an EOS transient raises the input/output voltage above the normal operating range. The sensing element is configured to change logic state when the transient reaches a predetermined threshold level. The change in state is used as a feedback path to turn on the interface driver transistor connected to ground and turn off the interface driver transistor connected to the power supply. The interface driver transistor connected to ground then acts to shunt away the transient, preventing damage to the driver and internal circuitry.

15 Claims, 4 Drawing Sheets

FIELD OXIDE TRANSISTOR BASED FEEDBACK CIRCUIT FOR ELECTRICAL OVERSTRESS PROTECTION

TECHNICAL FIELD

The present invention is directed to apparatus used to protect data input/output ports and the circuit elements electrically connected thereto from damage due to electrical overstress, and more specifically, to a circuit which uses a field oxide transistor and feedback scheme to sense an electrostatic discharge transient signal and control the shunting of the transient through an NMOS transistor to ground. This prevents the transient voltage spike from damaging the sensitive internal circuitry connected to the port.

BACKGROUND OF THE INVENTION

Electrical overstress (EOS) and electrostatic discharge (ESD) are reliability problems which can lead to the damage of sensitive integrated circuit components. An ungrounded conductive object or person can accumulate static electric charges by induction or by contact with charged insulators. If the object or person then comes in contact with an integrated circuit and is discharged through a path which is electrically connected to elements sensitive to the ESD transient, large currents will be generated which can damage those elements. In an integrated circuit, this damage typically occurs to the thin oxide layers and shallow junctions of the component transistors.

Owing to the sensitivity of the internal circuit elements which are part of an integrated circuit chip to damage arising from ESD, input/output devices connected to these elements are designed to be very robust, i.e., capable of handling large ESD transients without creating a conducting path to the circuit elements. Interface cable drivers are a specific example of I/O circuitry which require enhanced robustness and the ability to shield more sensitive internal circuit elements to which they are connected from damage. Interface cable drivers are electrically connected right behind the peripheral ports and connectors of many products and the protection circuitry associated with the drivers provides the first line of defense from EOS and ESD for the internal circuitry.

FIG. 1 is a schematic diagram of a conventional NMOS based I/O protection circuit 20 for preventing damage to the attached internal circuitry from EOS. As shown in the figure, protection circuit 20 is electrically positioned between I/O pad 22 and the internal circuitry to be protected from EOS. If Vx produced by an ESD signal applied to I/O pad 22 is much larger than $V_{DD}$ for NMOS transistor T1 24, then transistor 24 turns on due to punchthrough and Vx is clamped. This prevents the transient signal applied to I/O pad 22 from exceeding a value above which the internal circuitry would be damaged. If Vx is one threshold voltage level below ground, transistor 24 turns on naturally and the value of Vx applied to the internal circuitry is again limited (clamped) because a conducting path to ground is provided. Resistor 26 serves to protect transistor 24 by limiting the current and power flowing through the protection circuit.

In protection circuit 20 of FIG. 1, transistor 24 is configured to act as a diode, turning on and shunting the transient signal applied to I/O pad 22 to ground and away from the internal circuitry when the transient signal exceeds a desired level. This is the basic concept behind most protection circuits; at a predetermined level, a circuit element switches on and provides a conducting path for the signal to ground and away from the sensitive circuit elements. However, such diode (or equivalently, transistor configured to operate as a diode) based circuits have an inherent limitation. If the internal circuitry on the integrated circuit chip to which the protection circuit is connected is designed to operate at voltages above the diode breakdown voltage (or transistor punchthrough, etc.), then such a protection circuit will prevent the required voltage from reaching the circuitry. One solution is to design a diode (or transistor) with a higher breakdown voltage. However, this may require a redesign of the process flow used to construct the diode and internal circuitry. This is an expensive and inefficient solution to the problem.

FIGS. 2A–B are schematic diagrams of an improved version of the conventional NMOS based I/O protection circuit of FIG. 1. In FIG. 2A, diode D1 30 is connected between ground and the gate of transistor 24. The diode is used to prevent the breakdown of the thin gate oxide of transistor 24. Tying the gate of transistor 24 to ground through diode 30 can serve to reduce the EOS on the protection circuit. This is because during normal operation (i.e., Vx between zero and $V_{DD}$), the gate of transistor 24 is floating and the transistor is off. When the input transient signal exceeds the allowed range, transistor 24 turns on. At this time, some of the voltage swing is capacitively coupled from node A to node B. As a result, the thin gate oxide of transistor 24 is not stressed as much as it would be in the absence of diode 30. When diode 30 is turned on, the charge at the gate capacitance of transistor 24 is discharged and the input signal is clamped. FIG. 2B shows the same protection circuit as FIG. 2A with the exception that a properly configured transistor 32 (labelled "T2" in the figure) is used instead of diode 30. The circuits of FIGS. 2A–B act to shunt the transient signal to ground faster than the circuit of FIG. 1 by capacitively coupling the transient signal onto the gate of transistor 24, thereby turning on diode 30 or transistor 32 sooner.

FIG. 3 is a schematic diagram of a two-stage protection circuit which can be used to protect internal circuit elements from electrical overstress. In FIG. 3, a floating N well 40 is placed beneath pad 22 to prevent the pad metal from spiking into the substrate. Floating well 40 acts as a reverse-biased diode and isolates the metal from the substrate. Field oxide transistor (FOT) 42 and n-well enhanced diode 44 form the first stage of the protection circuit. FOT 42 has a large threshold potential, but is immune to the effects of EOS and ESD. Diode 44 serves as the source/drain diffusion of FOT 42. As is typical in such FOT based protection circuits, the gate and drain of FOT 42 are shorted together and tied to the input signal, with the source and body of FOT 42 tied to ground (or Vss).

FOT 42 and diode 44 are robust devices which clamp the gross voltage and current spikes produced by the transient signal applied to I/O pad 22. Thus, both FOT 42 and diode 44 provide a low resistive shunting path for the transient, removing the gross voltage spikes from the signal Diodes 46 and 48 form the second stage of the protection circuit. They act to filter out the smaller amplitude spikes which are not removed by the first stage devices. The use of an FOT as part of a protection circuit has the benefit that the device turns on and shunts away the transient (i.e., clamps the applied signal) at higher voltages than the breakdown voltage for diodes typically used in protection circuits. This eliminates one problem of using diodes in such protection circuits because the turn-on voltage of the FOT is typically above that of the power supply range used to operate the internal circuitry.

Although the protection circuits of FIGS. 2 and 3 provide improved operation over that of FIG. 1, they also have certain limitations. The circuits of FIGS. 2A–B respond faster and act to shunt the transient away sooner than the circuit of FIG. 1. However, they can still cause clamping at a voltage level below that desired for proper operation of the internal circuitry. In addition, the protection circuits of FIGS. 2A–B are susceptible to accidental triggering during rapid power up or by noisy power supplies, thereby preventing proper operation of the connected circuitry. This means that the protection circuit must be disabled during the power up cycle, an inefficient and potentially hazardous step.

The protection circuit of FIG. 3 has the disadvantage that diode 44 and/or FOT 42 may not turn on quickly enough to prevent the transient signal from damaging the internal circuitry. When the FOT begins conducting, it acts to shunt away a lower amount of current than it does at the higher gate to source voltage achieved after the turn-on period. Thus, during the turn-on period, the transient may propagate along a conductive path and damage the internal circuitry in addition, diodes 46 and 48 will typically clamp the signal at a level below that required for operation of some types of internal circuitry.

FIG. 4 is a schematic diagram 100 of a prior art design of an interface cable driver (the elements in the box labelled 102) with associated EOS protection circuit (diode 104). The output of circuit 102 is differential, thus the figure shows only one of two identical outputs. Lower output transistor 106 and upper output transistor 108 are typically NMOS transistors. As shown in the figure, a parasitic bipolar diode is formed by the source and drain junctions of transistors 106 and 108. Data generated, or to be processed, by the internal circuitry propagates along connected data lines 112. Driver circuit 102 is used to amplify the data provided on data lines 112 prior to its being sent out of an I/O port along attached cable 111, which is the medium along which an ESD transient signal would propagate. Thus, diode 104 (or another protection circuit) provides the first line of EOS defense for both interface driver 102 and the internal circuitry attached to data lines 112.

Interface cable driver circuit 102 must be capable of operating properly under a range of test conditions appropriate to the intended use of the circuit. Driver circuit 102 is typically tested in both voltage output low (VOL) and voltage output high (VOH) conditions with the current being forced into and out of output pad 110. A device of the type shown in FIG. 4 is deemed satisfactory if it can withstand a given current amount or compliance voltage under all applicable test conditions. When a current transient is forced out of output 110 in a VOL condition, the diodes formed by the drain-well and source-well junctions of transistors 106 and 108 conduct up to their maximum current density capability. During a VOL condition, when current is forced into the device, transistor 106 is on and will conduct its maximum current density, thus shunting away any transient received along cable 111 prior to the breakdown of diode 104. When driver 102 is in a VOH condition and the current is forced out of the device, the diodes formed by the drain-well and source-well junctions of transistors 106 and 108 conduct up to their maximum current density capability. However, when the output is in a VOH condition and current is forced into the device it will "snapback" transistor 106, force transistor 106 into secondary snapback and eventually damage driver 102 before it can meet the compliance voltage. Diode 104 is used as an EOS protection device to shield driver 102 and the internal circuitry attached to data lines 112 from any excessively strong transient signal by shunting it to ground when the transient voltage exceeds the breakdown voltage of the diode. Other suitable protection elements may of course be used, such as a properly configured transistor. In all such configurations of the driver and protection element(s), the protection elements are used to both sense the excessive transient and to operate to shunt the transient away from the driver circuit and into ground.

The operation of interface driver circuit 102 will now be explained in greater detail. Assume that the data value is a one. Then data-bar has a value of zero. The output of inverter 1 107 (labelled "inv1" in the figure) is a zero. The output of inverter 2 105 (labelled "inv2" in the figure) is a one. This means that transistor 108 is "off" and transistor 106 is "on". In such a situation, when a strong ESD transient is applied through the connection to cable 111, the breakdown of diode 104 produces a conducting path to ground labelled "Vss" in the figure) for the transient. In addition, the normal operation of transistor 106 provides a conducting path for any portion of the transient not shunted by diode 104.

Now consider the situation where the data value is a zero. Then data-bar has a value of one. The output of inverter 1 107 (labelled "inv1" in the figure) is a one. The output of inverter 2 105 (labelled "inv2" in the figure) is a zero. This means that transistor 108 is "on" and transistor 106 is "off". Now when a strong ESD transient is applied through the connection to cable 111, a problem can occur. With transistor 106 off and transistor 108 on, a conducting path is supplied through transistor 108 to the power supply (labelled "Vdd" in the figure). The transient can harm the power supply components, damage inverter 1 107, and possibly damage the internal circuitry connected to data lines 112.

While all of the ESD protection circuits described are capable of providing some degree of protection for the interface driver and/or internal circuitry, they all have disadvantages. These disadvantages become important when the operating voltage of the internal circuitry is above that of the breakdown voltage of the diode (or properly configured transistor) used to protect the circuitry. They also become important when the turn-on time or breakdown time of the protection circuit isn't fast enough to prevent a transient signal from either bypassing or propagating through the protection circuit to the sensitive internal circuitry.

What is desired is a circuit which provides EOS and ESD protection for an interface cable driver and other internal circuitry connected to the driver which overcomes the noted disadvantages of the art. These and other advantages of the present invention will be apparent to those skilled in the art upon a reading of the Detailed Description of the Invention together with the drawings.

SUMMARY OF THE INVENTION

The present invention is directed to a circuit for protecting an interface cable driver and the circuitry attached to the driver from electrical overstress damage, such as that which may arise from an electrostatic discharge. The protection circuit includes a sensing element, typically a field oxide transistor, which is used to sense when an EOS transient raises the input/output voltage above the normal operating range. The sensing element is configured to change logic state when the transient reaches a predetermined threshold level. The change in state is used as part of a feedback path to turn on an interface driver transistor connected to ground and turn off an interface driver transistor connected to the power supply. The interface driver transistor connected to ground then acts to shunt away the transient, preventing damage to the driver and internal circuitry.

Further objects and advantages of the present invention will become apparent from the following detailed description and accompanying drawings.

DETAILED DESCRIPTION OF THE INVENTION

Although the present invention will be described in the context of a cable interface driver, it is to be understood that the principles and methods of the invention can be applied to other types of circuits which require protection from electrical overstress. In general, the present invention consists of a sensor and associated logic which act together to sense an excessive ESD transient and shunt the transient safely to ground through an element of the circuit to which the protection circuit is connected.

Figure 5:
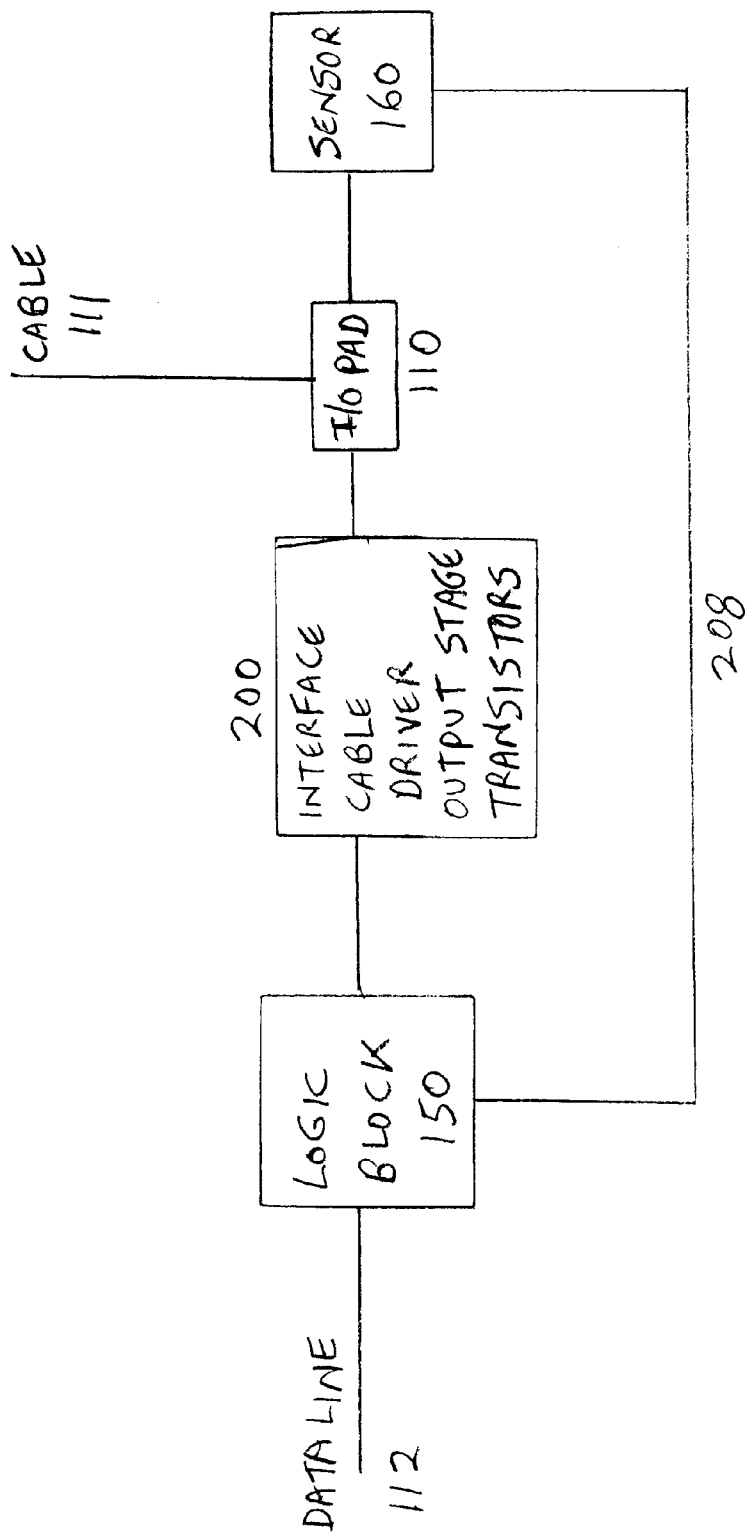
FIG. 5 is a block diagram showing the electrical overstress protection circuit of the present invention connected to an interface cable driver.

FIG. 5 is a block diagram showing the electrical overstress protection circuit of the present invention (which includes logic block 150, sensor 160, and feedback path 208) connected to an interface cable driver output stage 200. When an ESD transient is applied to I/O pad 110 by means of cable 111 connected to the pad, the voltage at the pad (or I/O port) increases. As this voltage increases, it reaches a level sufficient to "trip" sensor 160, causing sensor 160 to produce an output signal which is fed to logic block 150 by feedback path 208. The output signal from sensor 160 is input to logic block 150. A second input to logic block 150 is the data produced by the internal circuits connected to driver output stage 200 and the other elements of FIG. 5 by data line 112.

Driver output stage 200 contains an element which is capable of shunting the ESD transient to ground without damage to it or other elements of output stage 200. Logic block 150 is composed of logic elements which control the operation of the components of driver output stage 200 in such a manner as to "turn on" the shunting element(s) of output stage 200 and "turn off" any other elements of output stage 200 which require protection from the transient. Sensor 160 is thus used to sense the transient and provide a signal which causes logic block 150 to control driver output stage 200 so as to shunt away the transient. Sensor 160 does not itself provide a shunting path (conductive path to ground) for the transient, thus reducing the necessity for sensor 160 to be capable of handling the large voltages and currents associated with the ESD transients.

Although FIG. 5 depicts an interface cable driver as the circuit to which the EOS protection circuit of the present invention is attached, it will be understood to those skilled in the art that the principles of the present invention may be applied to other types of circuits requiring protection from ESD and EOS. In order to utilize the present invention, the circuit requiring protection should include an element capable of being controlled by logic block 150 so as to form a conducting path to safely shunt the transient to ground without damage to the shunting circuitry, or to any other internal circuitry connected by data line 112.

Figure 1:
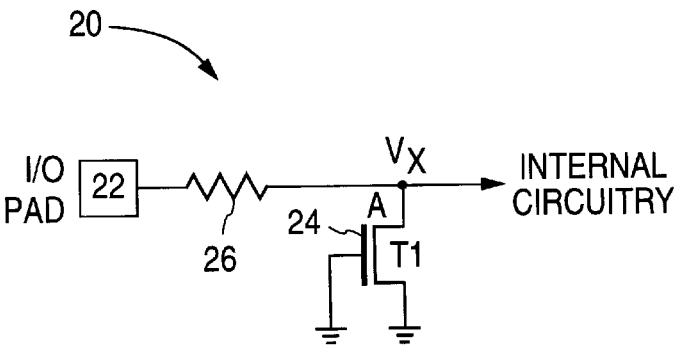
FIG. 1 is a schematic diagram of a conventional NMOS based I/O protection circuit for preventing damage to the attached internal circuitry from electrical overstress.
Figure 2:
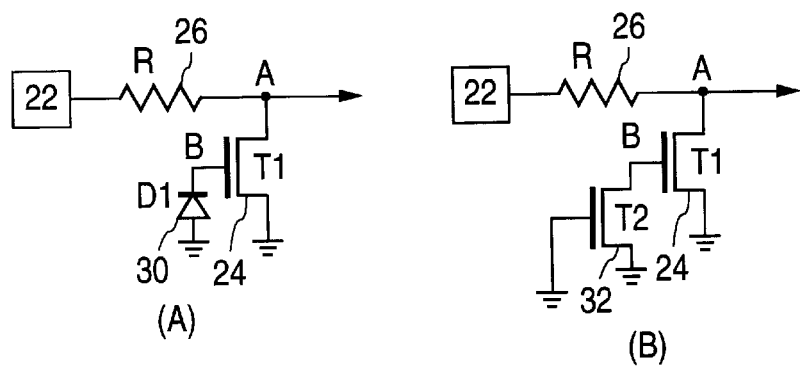
FIGS. 2A–B are schematic diagrams of an improved version of the conventional NMOS based I/O protection circuit of FIG. 1.
Figure 3:
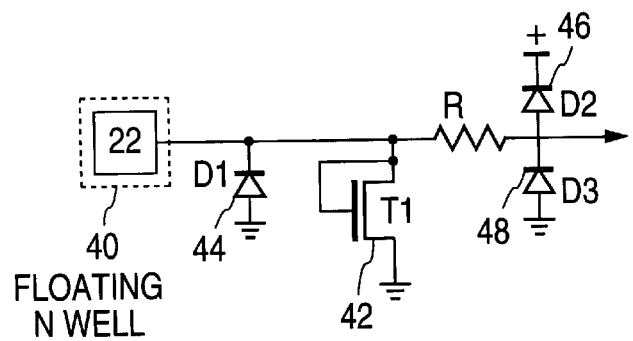
FIG. 3 is a schematic diagram of a two-stage protection circuit which can be used to protect internal circuit elements from electrical overstress.
Figure 4:
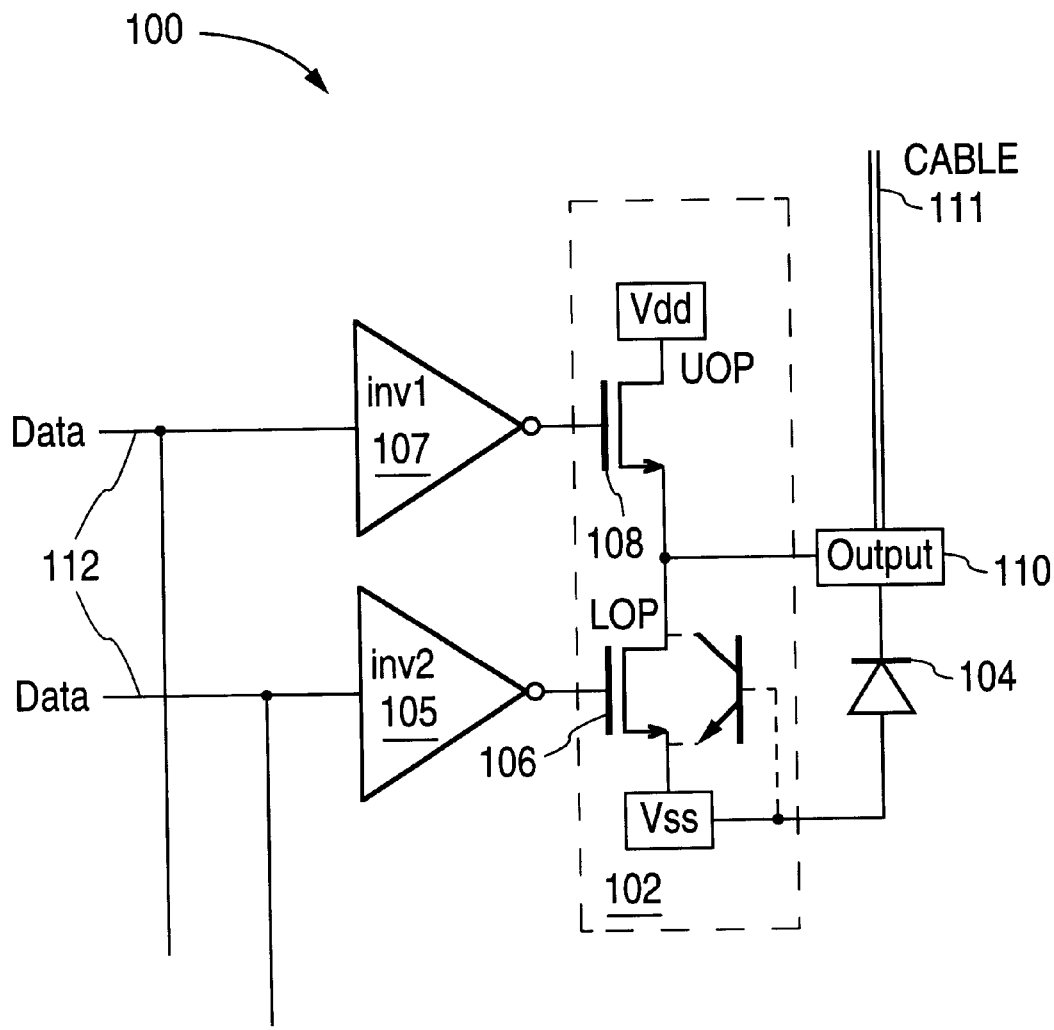
FIG. 4 is a schematic diagram of a prior art design of an interface cable driver with associated EOS protection circuit.
Figure 6:
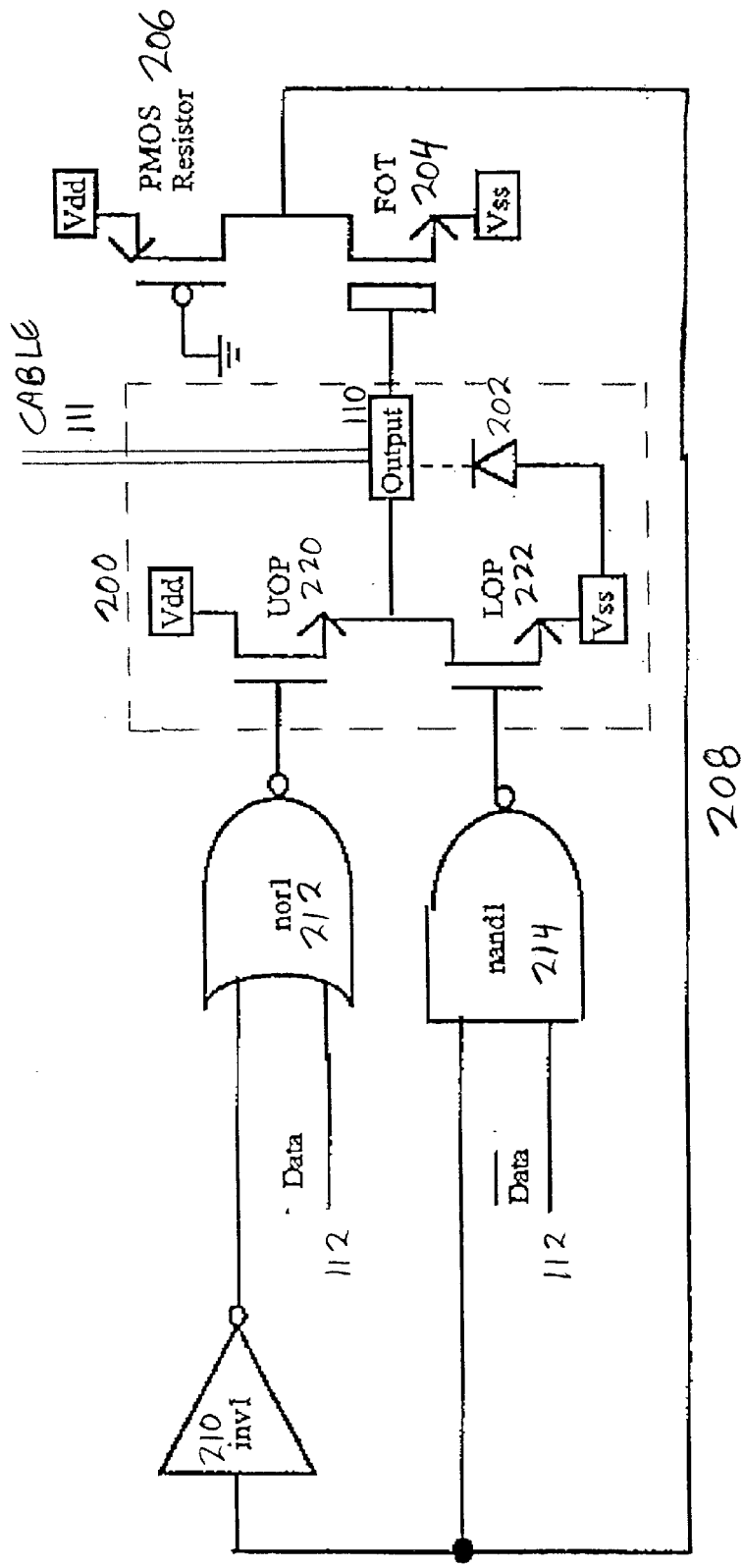
FIG. 6 is a schematic diagram showing the electrical overstress protection circuit of the present invention connected to the interface cable driver of FIG. 4.

FIG. 6 is a schematic diagram showing the electrical overstress circuit of the present invention connected to the interface cable driver output stage of FIG. 4. As was the case with FIG. 4, the output of circuit 200 is differential, thus the figure shows only one of two identical sets of circuit elements. The box labelled element 200 contains the circuitry of the cable interface driver output stage, with the remaining circuit elements shown in the figure being part of the present invention. Diode 202 represents an EOS protection element which may be incorporated into an existing driver output stage 200 or other circuit to which the present invention is connected. The dotted line connecting diode 202 to input/output pad 110 is meant to indicate that the present invention will function with or without the presence of diode 202. If included, diode 202 may be configured to provide an additional level of EOS/ESD protection in conjunction with the present invention. Thus, the present invention may be implemented in an embodiment in which diode 202 is not present and a second embodiment in which diode 202 is connected as shown.

The ESD transient sensing element of the present invention corresponding to sensor 160 of FIG. 5 is the combination of field oxide transistor (FOT) 204 and pull up PMOS resistor 206. The gate of FOT 204 is connected to I/O port 110, to which is attached cable 111. The drain of FOT 204 is held at a high logic state by means of grounded gate pull up PMOS resistor 206. When an ESD transient propagates along cable 111 and is received at port 110, it raises the port voltage above that of the normal operating level. This causes the voltage on the gate of FOT 204 to rise. When the gate voltage of FOT 204 reaches its threshold value, FOT 204 switches on and begins conducting. The drain of FOT 204 will then lower in voltage to a low voltage relative to the level it was held at by PMOS resistor 206. This change in logic state produces a signal which propagates along feedback path 208.

The signal provided by feedback path 208 is provided as an input to a logic circuit (corresponding to logic block 150 of FIG. 5) composed of inverter 210, NOR gate 212, and NAND gate 214. A second input to NOR gate 212 and NAND gate 214 is provided by data lines 112. With FOT 204 going low when a sufficiently strong ESD transient occurs, one input to NAND gate 214 is a logic value of zero. The low logic value is passed through inverter 210 to produce a high logic value as an input to NOR gate 212.

Consider the two cases of the data on data lines 112 being either high or low. If the data is high (corresponding to a logic value of one), then the inputs to NOR gate 212 are a logic one and a logic one, with the output being a logic zero. The inputs to NAND gate 214 are then a logic zero and a logic zero, with the output being a logic one. Thus, the signal applied to the gate of transistor 220 will be "low" and cause that transistor to turn off. Similarly, the signal applied to the gate of transistor 222 will be "high" and cause that transistor to turn on. This will provide a conducting path for the ESD transient applied to I/O port 110 to be shunted through transistor 222 to ground (labelled "Vss" in the figure). It is noted that transistor 222 is an element of driver 200 and, for purposes of being used with the present invention, has been designed (or modified if necessary) to be robust enough to handle the voltage and current levels associated with the expected transient(s) without suffering damage.

As transistor 222 shunts away the transient, the voltage at I/O port 110 is lowered. This will lower the voltage applied to the gate of FOT 204, turning off the FOT and resulting in a change in the logic signal provided along feedback path 208 from a low value to a high value. Feedback path 208 now provides a logic value of one as an input to NAND gate 214 and inverter 210. Thus, one input to NOR gate 212 is now a zero logic value. With the data value still a one, the output of NOR gate 212 is again a zero, and the output of NAND gate 214 is again a one. If the transient is not completely shunted away or a second transient occurs, the voltage level at I/O port 110 will increase and FOT 204 will again function as a sensor which switches logic states when the level of the transient exceeds a threshold value. This will again cause transistor 222 to act as a shunting path for the transient. In operation, the feedback scheme of the present invention is believed to cause transistor 222 to "oscillate" between an "on" and "off" state until the transient is dissipated.

Now consider the case where the data is low (corresponding to a logic value of zero). With FOT 204 going low when a sufficiently strong ESD transient occurs, the inputs to NOR gate 212 are a logic one and a logic zero, with the output being a logic zero. The inputs to NAND gate 214 are then a logic zero and a logic one, with the output being a logic one. Thus, the signal applied to the gate of transistor 220 will be "low" and cause that transistor to turn off. Similarly, the signal applied to the gate of transistor 222 will be "high" and cause that transistor to turn on. This will provide a conducting path for the ESD transient applied to I/O port 110 to be shunted through transistor 222 to ground.

As the transient dissipates and the voltage applied to the gate of FOT 204 is lowered, FOT 204 will turn off. This will result in a change in the logic signal provided along feedback path 208 from a low value to a high value. Feedback path 208 now provides a logic value of one as an input to NAND gate 214 and inverter 210. Thus, this input to NOR gate 212 is now a zero logic value. With the data value being a zero, the output of NOR gate 212 is a one, and the output of NAND gate 214 is a logic zero. In this situation, transistor 222 turns off, discontinuing the conducting path for the ESD transient.

In summary, regardless of the state of data 112, a "0" logic state on NAND gate 214 in conjunction with a "1" logic state on NOR gate 212 will turn on transistor 222 and turn off transistor 220. This defines the control signals which the sensor generates and provides a mechanism for the shunting of the transient signal.

As noted, for purposes of providing a shunting path for the ESD transient, transistor 222 (and if needed, transistor 220) which is part of driver 200 is designed to be capable of handling the range of voltages and currents expected to be produced by the transient. In the present case, this was accomplished by making NMOS transistor 222 large enough to shunt the maximum transients expected. The NMOS W/L was designed to conduct an $I_{DSsat}$ large enough for protection from the modeled transient (estimated at 300 mA, corresponding to the charged cable test protocol for ESD). In particular, the effective width of NMOS transistor 222 was enlarged from the value it would normally have in the absence of being used in conjunction with the present invention.

The present invention has been shown to provide protection for interface cable drivers and connected circuitry from ESD transients over a wide range of pulse characteristics. In particular, the present invention has been shown to properly shunt EOS/ESD transients up to a level 3 EOS/ESD rating (i.e., the Charge Cable Model—110 $\mu$Ws energy with capacitors from 300 pF to 1 $\mu$F), the Human Body Model (HBM), Latchup A (+/−200 mA), Latchup B (+/−300 mA), and the Zero Ohm Model (the machine model).

The combination of the protection circuitry of the present invention and the modifications made to the driver circuit produces a device which performs better than the driver and diode protection element of FIG. 4. When current is forced out of the driver during a VOH condition, the voltage at the output pad begins to rise quickly, yet no current is conducted at this point Just prior to snapback of transistor 222, the voltage reaches the threshold value of the FOT which is part of the protection circuitry. This causes the output of the sensor element which includes the FOT to change, controlling the operation of the shunting element. The protection circuit then takes care of shunting away the transient.

The present invention uses the FOT as a transient signal sensing device and trigger for providing an input to a logic circuit which controls the operation of a shunting element. The logic circuit causes the shunting element to assume a condition which forms a conductive path for the transient, while protecting the other elements of the circuit which contain the shunting element. This permits the transient to be shunted safely to ground under normal operating conditions. In the situation in which the gate voltage of the FOT is near the threshold voltage of the transistor and a transient is required to be shunted, the present invention causes the FOT to change state and trigger the shunting of the transient. The design of the present invention does not require the FOT to clamp the transient and act as the shunting device, thereby removing the disadvantages (e.g., the slow turn on time of the FOT) and potential damage to the connected circuitry which can occur under such circumstances.

The present invention may be used to protect other types of circuits which function as output buffers and the internal circuitry to which the output circuits are connected By incorporating the ESD shunting requirements into the design of the circuitry to be protected, the shunting ability of the circuit element(s) may be used in conjunction with the sensor and logic of the present invention to provide a high degree of ESD protection.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. Protection circuitry for protecting a circuit that has a maximum high operating voltage from damage due to electrical overstress resulting from a transient voltage applied to a node of the circuit to be protected, wherein the transient voltage is equal to or greater than a selected peak voltage, the peak voltage being greater than the maximum high operating voltage of the circuit to be protected, the protection circuitry comprising:

a sensor that includes a field oxide transistor having a threshold voltage equal to the selected peak voltage, the gate of the field oxide transistor being connected to said node of the circuit to be protected such that the field oxide transistor turns on when the transient voltage is applied to said node, whereby the sensor provides an active sensor output signal;

a logic circuit connected to receive the active sensor output signal as an input and that responds to the active sensor output signal by generating an active logic circuit output signal; and a transient signal shunting element connected to said node and that responds to the active logic circuit output signal by providing a conductive path to shunt the transient voltage to a negative supply.

2. Protection circuitry as in claim 1, and wherein the transient signal shunting element includes an n-channel MOS shunting transistor having its gate connected to receive the logic circuit output signal, its source connected to the negative supply and its drain connected to said node, such that the active logic circuit output signal causes the transient voltage to be shunted through the n-channel MOS transistor to the negative supply.

3. Protection circuitry as in claim 2, and wherein shunting of the transient voltage through the n-channel MOS transistor lowers the voltage at said node to below said selected peak voltage, thereby causing said field oxide transistor to turn off and resulting in a change in state of the logic circuit output signal such that said n-channel MOS transistor turns off, whereby said n-channel MOS transistor is caused to oscillate between an "on" state and an "off" state until said transient voltage is dissipated from said node.

4. Protection circuitry as in claim 1, and wherein said circuit to be protected is connected to receive a positive supply voltage, and wherein said maximum high operating voltage is greater than said positive supply voltage.

5. Protection circuitry as in claim 1, and wherein the logic circuit comprises cable driver output stage circuitry, and wherein said node of the circuit to be protected is adapted for connection of a cable thereto.

6. Protection circuitry as in claim 1, and wherein the transient signal shunting element is an element of the circuit to be protected.

7. A method of protecting a circuit that has a maximum high operating voltage from damage due to electrical overstress resulting from a transient voltage applied to a node of the circuit to be protected, wherein the transient voltage is equal to or greater than a selected peak voltage, the peak voltage being greater than the maximum high operating voltage of the circuit to be protected, the method comprising:

applying the transient voltage applied to said node of the circuit to be protected to a gate of a field oxide transistor, the field oxide transistor having a threshold voltage equal to the selected peak voltage such that the field oxide transistor turns on when the transient voltage is applied to said node to provide an active sensor output signal;

applying the active sensor output signal to a logic circuit that responds to the active sensor output signal by providing an active logic circuit output signal that changes from an inactive logic state to an active logic state upon receipt of the active sensor output signal by the logic circuit; and responding to the active logic state of the logic circuit output signal by causing a transient signal shunting element connected to said node to form a conductive path that shunts the transient voltage to a negative supply.

8. A method as in claim 7, and wherein the transient signal shunting element includes an n-channel MOS transistor having its gate connected to receive the logic circuit output signal, its source connected to the negative supply and its drain connected to said node, such that the active logic state of the logic circuit output signal causes the transient voltage to be shunted through the n-channel MOS transistor to the negative supply.

9. A method as in claim 8, and wherein shunting of the transient voltage through the n-channel MOS transistor lowers the voltage at said node to below said selected peak voltage, thereby causing said field oxide transistor to turn off and resulting in a change in state of the logic circuit output signal from the active logic state to the inactive logic state such that said n-channel MOS transistor turns off, whereby said n-channel MOS transistor is caused to oscillate between an "on" state and an "off" state until said transient voltage is dissipated from said node.

10. A method as in claim 7, and wherein said circuit to be protected is connected to receive a positive supply voltage, and wherein said maximum high operating voltage is greater than said positive supply voltage.

11. A method as in claim 7, and wherein said logic circuit comprises a cable driver output stage, and wherein said node of the circuit to be protected is adapted for connection to a cable.

12. Protection circuitry for protecting a circuit that has a maximum high operating voltage from damage due to electrical overstress from a transient voltage applied to a node of the circuit to be protected, wherein the transient voltage is equal to or greater than a selected peak voltage, the peak voltage being greater than the maximum high operating voltage of the circuit to be protected, the protection circuitry comprising:

a field oxide transistor having its gate connected to said node of the circuit to be protected, its drain coupled to a positive supply voltage and its source connected to a negative supply, the field oxide transistor having a threshold voltage equal to the peak voltage such that the field oxide transistor turns on when the transient voltage is applied to said node and provides a sensor signal having a high logic state at its drain;

a logic circuit connected to the drain of the field oxide transistor, the logic circuit responding to a sensor signal having low logic state by providing a first logic circuit output signal having a low logic state, the first logic circuit output signal having a high logic state when the sensor signal has a high logic state; and an n-channel MOS shunting transistor having its gate connected to receive the first logic circuit output signal, its source connected to the negative supply and its drain connected to said node of the circuit to be protected;

whereby the n-channel MOS shunting transistor responds to the high logic state of the first logic circuit output signal by turning on to provide a conductive path to shunt the transient voltage to the negative supply.

13. Protection circuitry as in claim 12, and wherein the drain of the field oxide transistor is coupled to the positive supply via a PMOS resistor.

14. Protection circuitry as in claim 13, and wherein the logic circuit includes a first logic element that responds to the high logic state of the sensor signal by providing the first logic circuit output signal having the high logic state and a second logic element that responds to the high logic state of the sensor signal by providing a second logic circuit output signal having a low logic state, the protection circuitry further comprising an n-channel MOS driver transistor having its gate connected to receive the second logic circuit output signal, its source connected to the drain of the n-channel MOS shunting transistor and its drain connected to the positive supply.

15. Protection circuitry as in claim 14, and wherein the first logic element comprises a NAND gate that receives the sensor signal as inputs, and wherein the second logic element comprises a NOR gate that receives the data signal as a first input and that receives an inverted sensor signal as a second input.

* * * * *

UNITED STATES PATENT AND TRADEMARK OFFICE
CERTIFICATE OF CORRECTION

PATENT NO.: 5,910,873
DATED: June 8, 1999
INVENTOR(S): Luis Sergio V. Boluña et al.

It is certified that errors appear in the above-identified patent and that said Letters Patent is hereby corrected as shown below:

On the Cover Page, after [19], delete "Bolua et al." and replace with --Boluña et al.--.

On the Cover Page, at [75], after "Inventors", delete "Luis Sergio V. Bolua" and replace with --Luis Sergio V. Boluña--.

Signed and Sealed this

Second Day of November, 1999

Attest:

Q. TODD DICKINSON

Attesting Officer

Acting Commissioner of Patents and Trademarks